(12) United States Patent
Nagata et al.

(10) Patent No.: US 10,507,782 B2
(45) Date of Patent: Dec. 17, 2019

(54) AIRBAG APPARATUS

(71) Applicant: TOYODA GOSEI CO., LTD., Kiyosu-shi, Aichi-ken (JP)

(72) Inventors: Matsuo Nagata, Kiyosu (JP); Akihisa Tange, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 280 days.

(21) Appl. No.: 15/615,948

(22) Filed: Jun. 7, 2017

(65) Prior Publication Data

US 2017/0361803 A1    Dec. 21, 2017

(30) Foreign Application Priority Data

Jun. 21, 2016    (JP) ................................ 2016-122801

(51) Int. Cl.
*B60R 21/217*    (2011.01)
*B60R 21/207*    (2006.01)

(52) U.S. Cl.
CPC ........ *B60R 21/217* (2013.01); *B60R 21/2171* (2013.01); *B60R 21/207* (2013.01)

(58) Field of Classification Search
CPC .......................... B60R 21/217; B60R 21/2171
See application file for complete search history.

(56) References Cited

U.S. PATENT DOCUMENTS 7,226,077 B2 *   6/2007   Abe .................. B60R 21/206
                                                  280/728.1
2011/0316263 A1   12/2011  Lunt et al.

FOREIGN PATENT DOCUMENTS

DE    10 2010 032 175 A1    1/2012

OTHER PUBLICATIONS

Office action dated May 21, 2019 issued in corresponding JP patent application No. 2016-122801 (and English translation thereof).

* cited by examiner

*Primary Examiner* — Paul N Dickson
*Assistant Examiner* — Joselynn Y Sliteris
(74) *Attorney, Agent, or Firm* — Posz Law Group, PLC (57) ABSTRACT

An airbag apparatus includes a gas generator and an airbag. The gas generator includes a gas generator main body and at least one mounting protrusion. The airbag includes a first fabric portion, a second fabric portion, and a storage chamber located between the first fabric portion and the second fabric portion. Part of the storage chamber is constituted by the first fabric portion. The storage chamber includes as insertion port, which allows the gas generator to be inserted, and one or more mounting holes, which allow the at least one mounting protrusion to be passed. The rearmost one in the insertion direction of the one or more mounting holes is a rearmost mounting hole. The storage chamber further includes an opening promoting portion, which is located between the insertion port and the rearmost mounting hole and causes the insertion port to open.

4 Claims, 9 Drawing Sheets

Fig.10A    Fig.10B

AIRBAG APPARATUS

BACKGROUND OF THE INVENTION

The present invention relates to an airbag apparatus that protects an occupant from an impact by deploying and inflating an airbag at a position close to the occupant seated in a vehicle seat when an impact due to, for example, a collision is applied to the vehicle.

An airbag apparatus is effective for protecting an occupant from an impact when an impact due to, for example, a collision is applied to an automobile. One known form of the airbag apparatus includes an elongated gas generator and an airbag. The gas generator extends along an axis and elects inflating gas. The airbag is inflated by inflation gas ejected from the gas generator.

The gas generator has a pair of mounting protrusions for mounting the gas generator to a vehicle. The mounting protrusions protrude from the outer circumference of the gas generator in the same direction that is orthogonal to the axis of the gas generator.

The main part of the airbag is constituted by a main fabric portion. The main fabric portion is folded in half along a fold line set in the center in the width direction. The peripheral portions of the folded main fabric portion are sewn together.

The airbag apparatus disclosed in German Patent Application Publication No. 102010032175 includes an auxiliary fabric portion superposed on the fold line of a main fabric portion. In the main fabric portion and the auxiliary fabric portion, an insertion port for inserting a gas generator is provided in a section across the fold line. The main fabric portion and the auxiliary fabric portion have a mounting hole located on the leading side of the insertion port in the insertion direction of the gas generator.

Although German Patent Application Publication No. 102010032175 has no description regarding a gas generator, a gas generator is inserted in the airbag through the insertion port when installed in the airbag. It is presumed that one of the mounting protrusions of the gas generator is passed through the mounting hole, and the other mounting protrusion is passed through part of the insertion port that is located on the leading side in the insertion direction of the gas generator.

Further, the airbag apparatus disclosed in German Patent Application Publication No. 102010032175 has a sewn portion in the main fabric portion and the auxiliary fabric portion. The sewn portion is located in a region between the mounting hole and a section that is away from and on the leading side of the insertion port in the insertion direction of the gas generator. The sewn portion reinforces the region of the main fabric portion and the auxiliary fabric portion.

A structure that allows for easy insertion of a gas generator is desired in an airbag apparatus of the type in which a gas generator is inserted into the airbag through an insertion port as described above. However, German Patent Application Publication No. 102010032175 does not particularly give consideration to structures for facilitating insertion of the gas generator through the insertion port.

It is also possible to make the sewn portion function to open the insertion port. This is because the stiffness around the sewn portion of the main fabric portion and the auxiliary fabric portion is increased, and the sewn portion is located in a section across the fold line, along which the main fabric portion is folded in half. Opening to the insertion port is accomplished through the portion of the increased stiffness returning to the flat state from the folded state. However, as described above, the sewn portion is located in a region between the mounting hole and the section that is away from and on the leading side of the insertion port in the insertion direction. Therefore, if the sewn portion were caused to function to open the insertion port, no great effect would be expected.

SUMMARY OF THE INVENTION

It is an objective of the present invention to provide an airbag apparatus capable of improving easiness of insertion of a gas generator into an airbag through an insertion port.

To achieve the foregoing objective and in accordance with one aspect of the present invention, an airbag apparatus is provided that includes a gas generator and an airbag. The gas generator includes an elongated gas generator main body, which extends along an axis and discharges inflation gas, and at least one mounting protrusion, which projects in a direction orthogonal to the axis from at least one position in a direction along the axis. The airbag is inflated by the inflation gas. The airbag apparatus is configured to be mounted to a vehicle at the at least one mounting protrusion. The airbag includes at least a first fabric portion and a second fabric portion, which are superposed on each other in a thickness direction, and a storage chamber, which is located between the first fabric portion and the second fabric portion. Part of the storage chamber is constituted by the first fabric portion. The storage chamber includes an insertion port, one or more mounting holes, and an opening promoting portion. The insertion port allows the gas generator to be inserted through at least the first fabric portion. The one or more mounting holes are located at positions that are on a leading side of the insertion port of the storage chamber in an insertion direction of the gas generator. The one or more mounting holes allow the at least one mounting protrusion to be passed through at least the first fabric portion. A rearmost one in the insertion direction of the one or more mounting holes is a rearmost mounting hole. The opening promoting portion is located between the insertion port and the rearmost mounting hole and causes the insertion port to open.

DETAILED DESCRIPTION OF THE PREFERRED EMBODIMENTS

An airbag apparatus according to one embodiment will now be described with reference to the drawings. In the embodiment, the airbag apparatus is employed as an automobile side airbag apparatus.

In the following description, the direction in which the automobile advances will be referred to as the front, and the reverse direction will be referred to as the rear. The center in the width direction of the automobile (the automobile width direction) is used as a reference. The side closer to the center in the automobile width direction will be referred to as the inner side of the automobile, while the side farther from the center in the automobile width direction will be referred to the outer side of the automobile.

It is provided that an average sized adult occupant is seated on an automobile seat in a predetermined normal posture.

Figure 1:
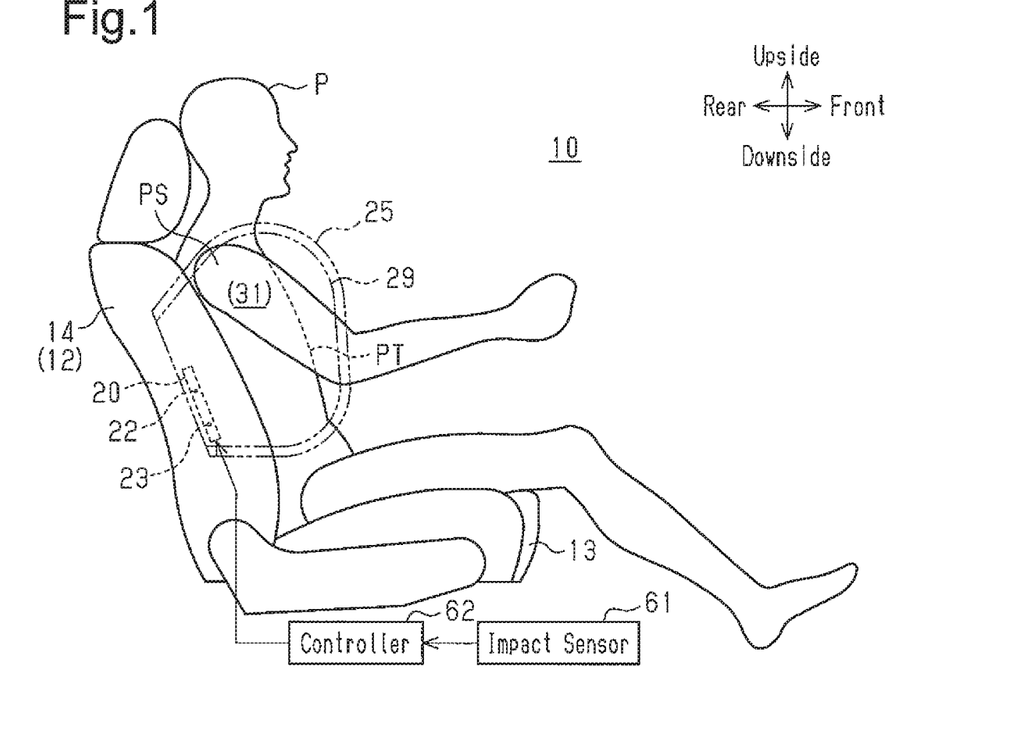
FIG. 1 is a side view of an automobile side airbag apparatus according to one embodiment, illustrating, together with an occupant, the apparatus installed in an automobile seat.

As shown in FIG. 1, the automobile seat 12 is arranged in the vicinity of the inner side of a body side portion of the automobile 10. The body side portion refers to an automobile component that is located in the side of the automobile 10, and mainly corresponds to doors and pillars. For example, the part of the body side portion corresponding to a front seat includes a front door and a center pillar (a B-pillar). The part of the body side portion corresponding to a rear seat includes a rear part of a side door (rear door), a C-pillar, a front part of a wheel well, and a rear quarter.

The automobile seat 12 includes a seat cushion 13 and a seat back 14, which is located behind the seat cushion 13 and extends diagonally upward and rearward. The automobile seat 12 is arranged in the automobile 10 such that the seat back 14 faces forward. The width direction of the thusly arranged automobile seat 12 coincides with the automobile width direction.

Figure 7A:
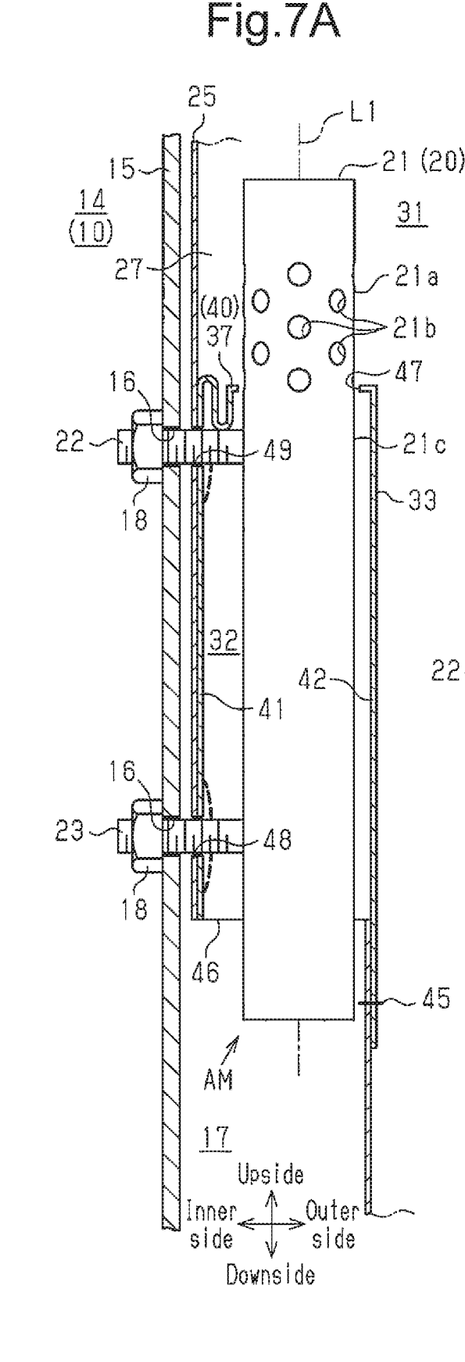
FIG. 7A is a partial cross-sectional view of the embodiment, illustrating a state in which the gas generator is attached to the side frame portion of an automobile seat together with the airbag.
Figure 7B:
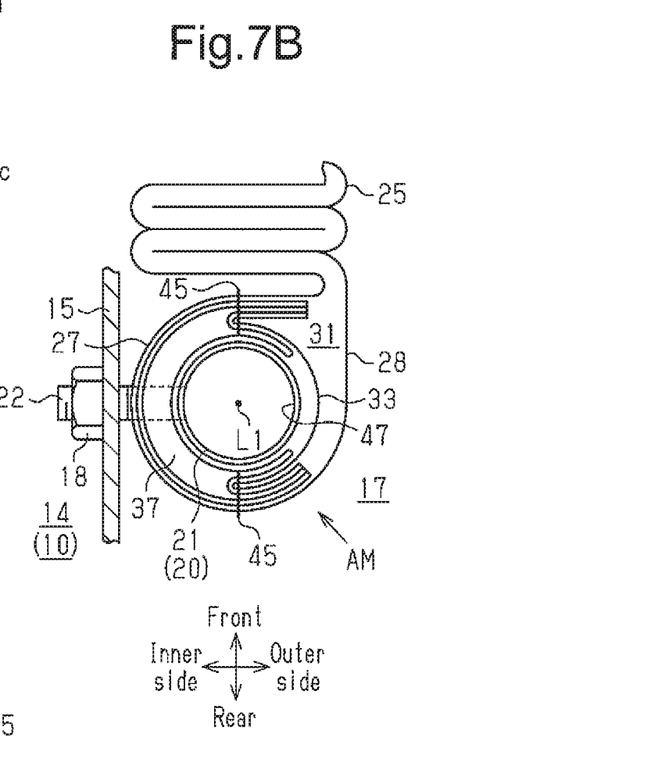
FIG. 7B is a cross-sectional plan view illustrating part of FIG. 7A.

The seat back 14 incorporates a seat frame, which constitutes the framework of the seat back 14. Part of the seat frame is configured by a side frame portion 15, which is located in the outer-side portion of the seat back 14 as shown in FIGS. 7A and 7B.

The seat back 14 incorporates a storage portion 17 in a side portion on the outer side. The storage portion 17 accommodates an airbag module AM, which constitutes the main part of the side airbag apparatus. The airbag module AM includes as its main components a gas generator 20 and an airbag 25. Each of these components will now be described.

<Gas Generator 20>

The gas generator 20 is composed of a gas generator main body, which is the main part of the gas generator 20, and one or more mounting protrusions for mounting the gas generator main body to the side frame portion 15.

In the present embodiment, the gas generator main body is configured by an elongated inflator 21. As shown in FIG. 7A, the inflator 21 includes a columnar gas outlet portion 21a and a columnar non-outlet portion 21c. The non-outlet portion 21c is adjacent to and coaxial with the gas outlet portion 21a. The non-outlet portion 21c stores a gas generating agent (not shown), which generates inflation gas. The gas outlet portion 21a has gas discharging holes 21b for discharging inflation gas in the outer periphery. A harness (not shown), which is wiring for inputting activation signals to the inflator 21, is connected to one end (the lower end) of the non-outlet portion 21c on the opposite to the gas outlet portion 21a.

The inflator 21, which uses a gas generating agent, is generally referred to as the pyrotechnic type. In place of a pyrotechnic type inflator, it is possible to use a hybrid type inflator, which discharges inflation gas by breaking, with a low explosive, a partition wall of a high-pressure gas cylinder filled with high-pressure gas.

Bolts serving as mounting protrusions are provided on the outer circumferential surface of the non-outlet portion 21c. The bolts are located at two positions spaced apart (downward) from the gas outlet portion 21a in the direction along the axis L1 of the inflator 21. The bolts protrude in the same direction that is orthogonal to the axis L1. One of the bolts is located at a position below and adjacent to the gas outlet portion 21a. The distance between this bolt and the lower end of the gas outlet portion 21a is shorter than that in a typical inflator. The other bolt is located in a lower part of the non-outlet portion 21c. To distinguish the two bolts (the two mounting protrusions), the former bolt, which is below and adjacent to the gas outlet portion 21a, will be referred to as a specified mounting protrusion 22. The latter bolt, which is located in a lower part of the non-outlet portion 21c, will be referred to simply as a mounting protrusion 23. As the mounting protrusion 23, a member having a length shorter than or equal to that of the specified mounting protrusion 22 is used.

Since the specified mounting protrusion 22 is located at a position close to the gas outlet portion 21a as described above, the size of the inflator 21 along the axis L1 can be reduced.

<Airbag 25>

Figure 3A:
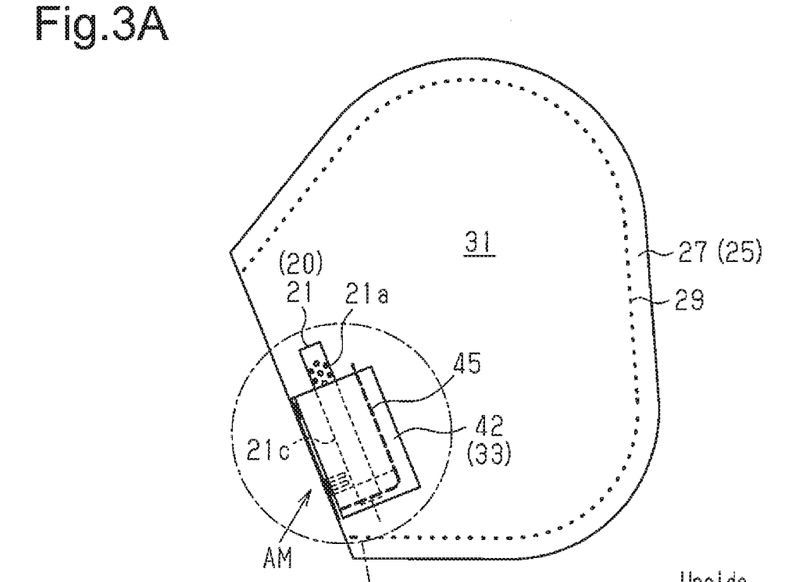
FIG. 3A is a cross-sectional side view illustrating the internal structure of the airbag module of the embodiment as viewed from the outer side of the automobile.
Figure 3B:
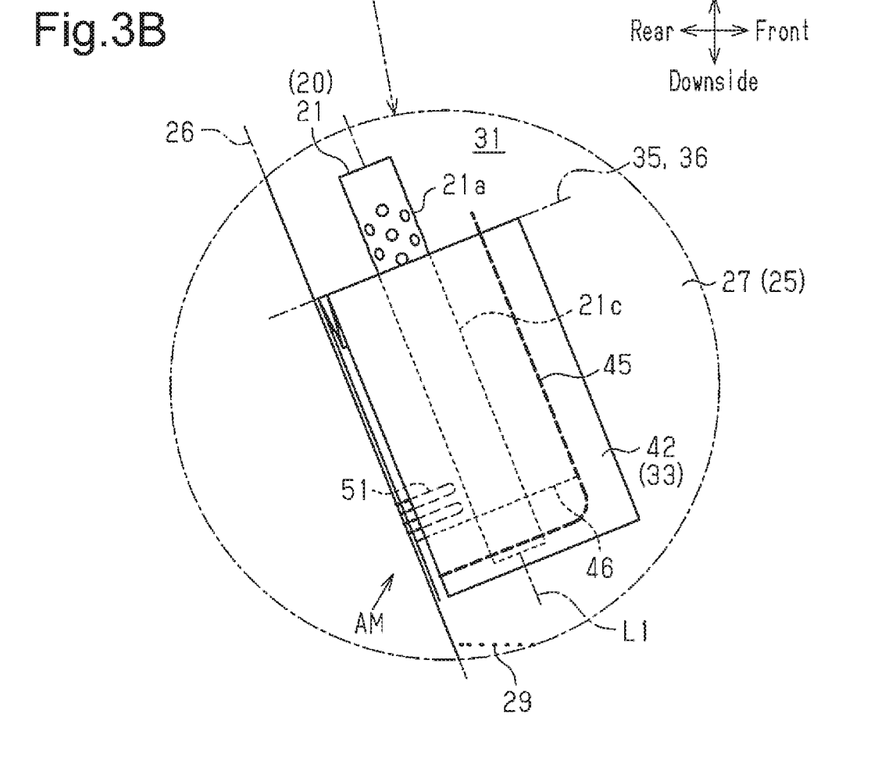
FIG. 3B is an enlarged partial cross-sectional side view illustrating part of FIG. 3A.
Figure 4A:
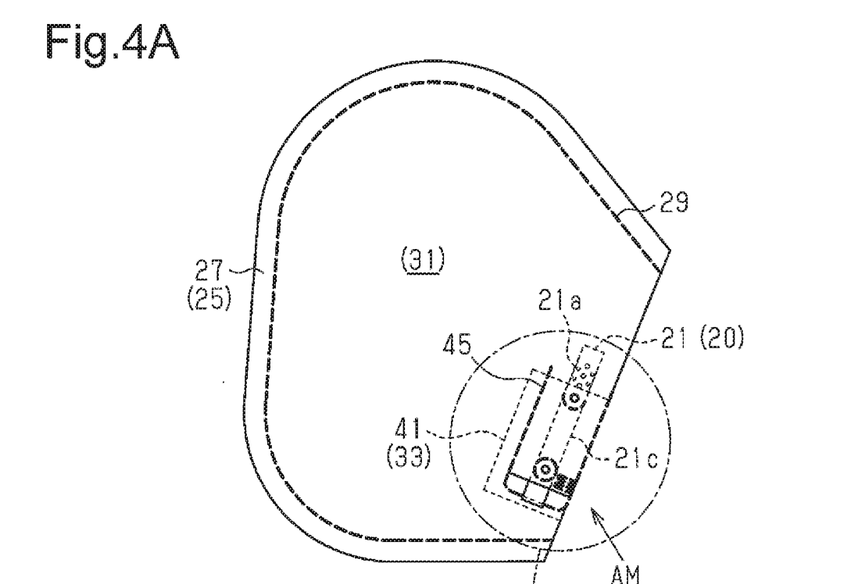
FIG. 4A is a side view illustrating the airbag module of the embodiment as viewed from the inner side of the automobile.
Figure 4B:
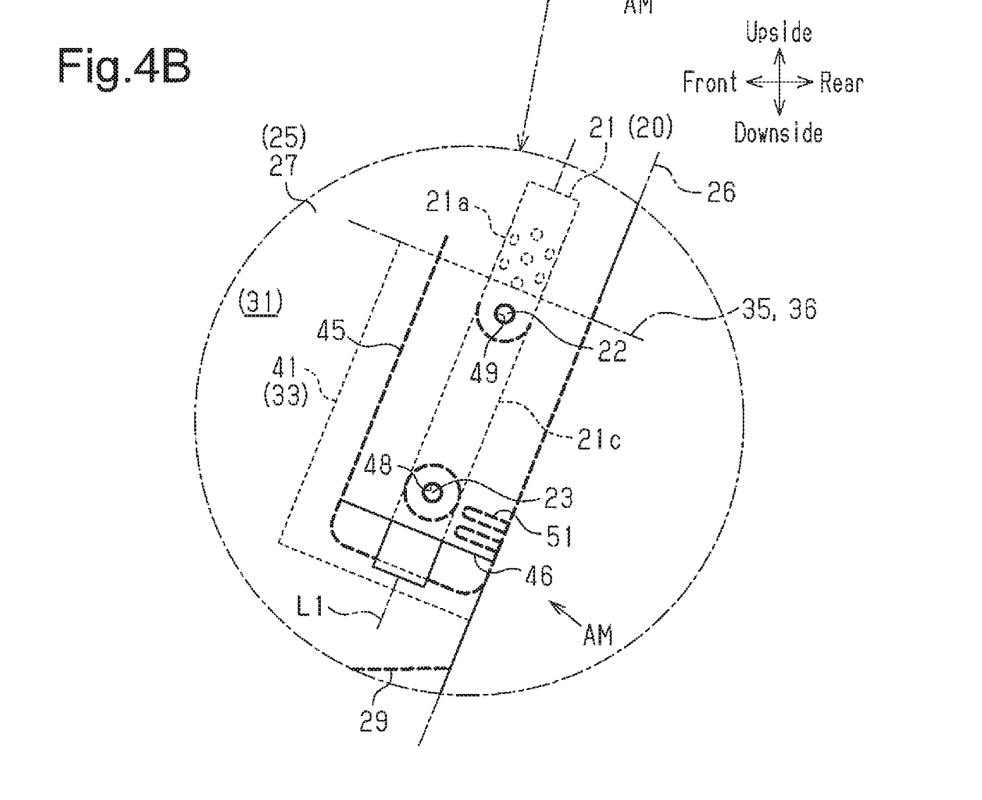
FIG. 4B is an enlarged partial side view illustrating part of FIG. 4A.
Figure 5A:
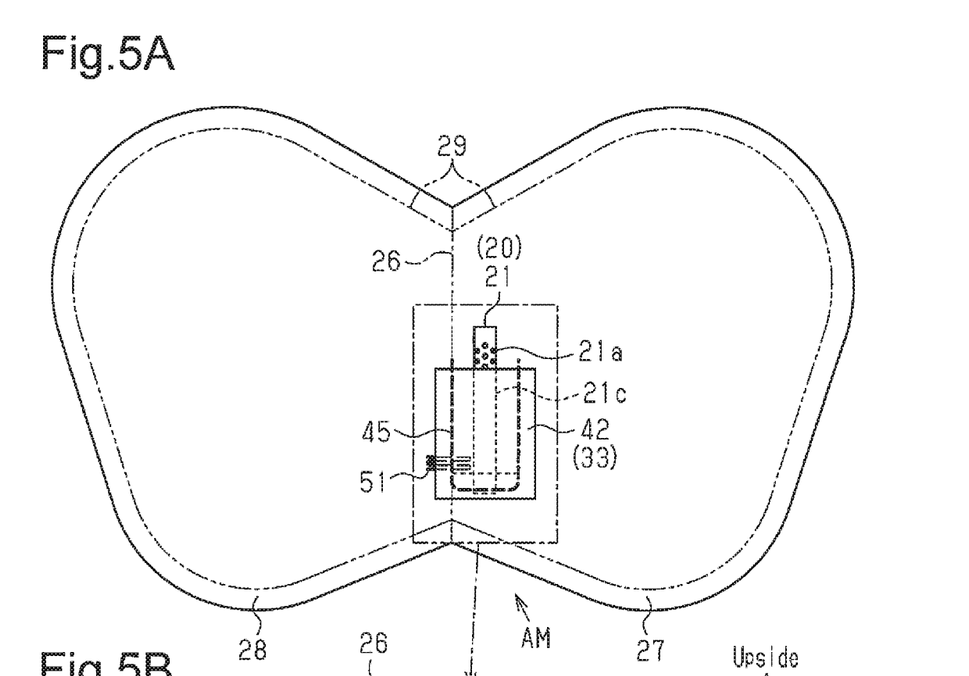
FIG. 5A is a developed view illustrating the airbag module of the embodiment in a state in which the airbag is spread flat with the peripheral joint portion disjoined.
Figure 5B:
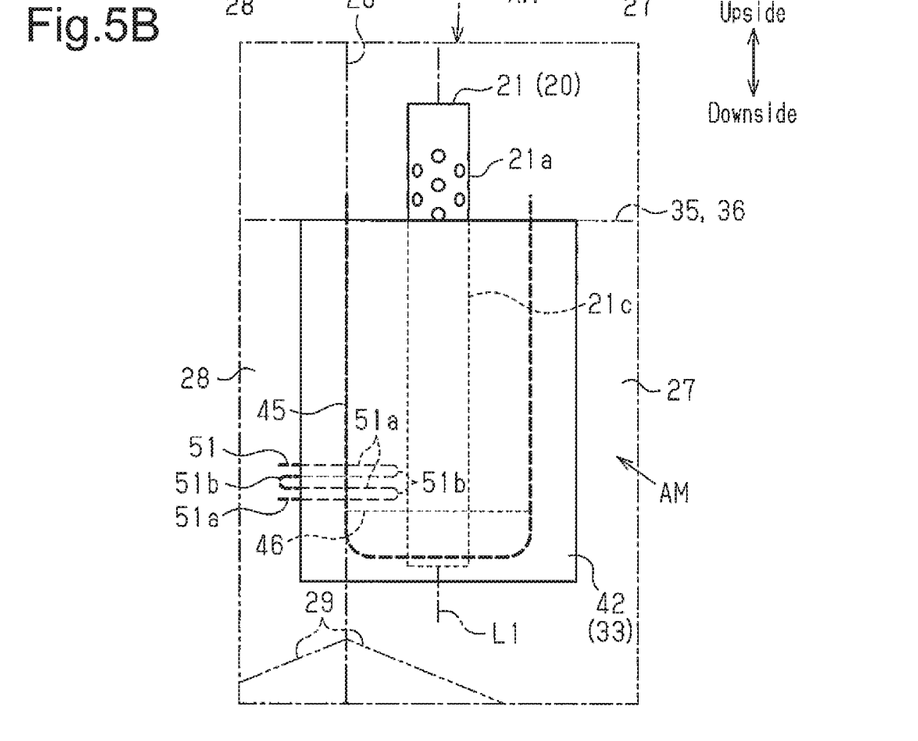
FIG. 5B is an enlarged developed view illustrating part of FIG. 5A.
Figure 6A:
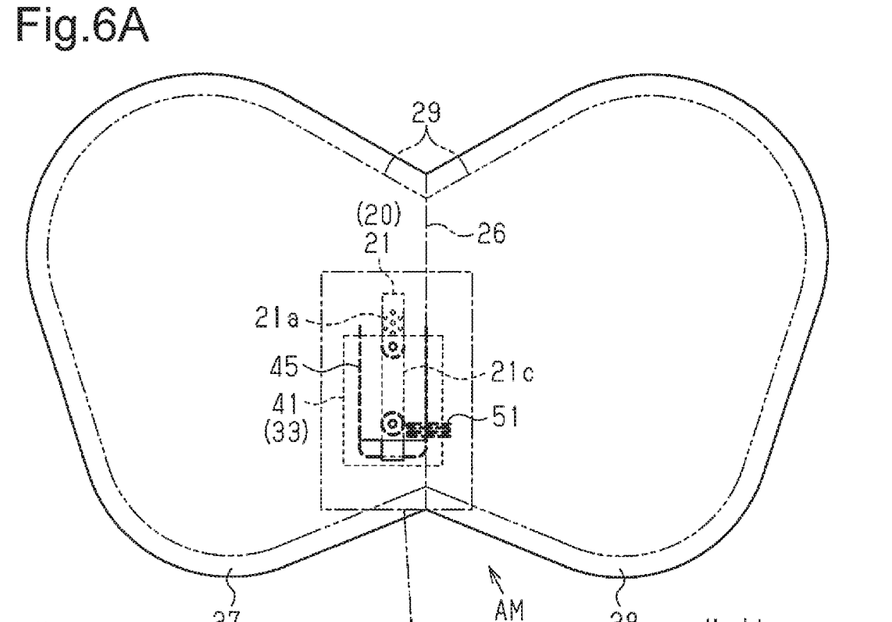
FIG. 6A is a developed view of the airbag module of FIG. 5A as viewed from the back side.
Figure 6B:
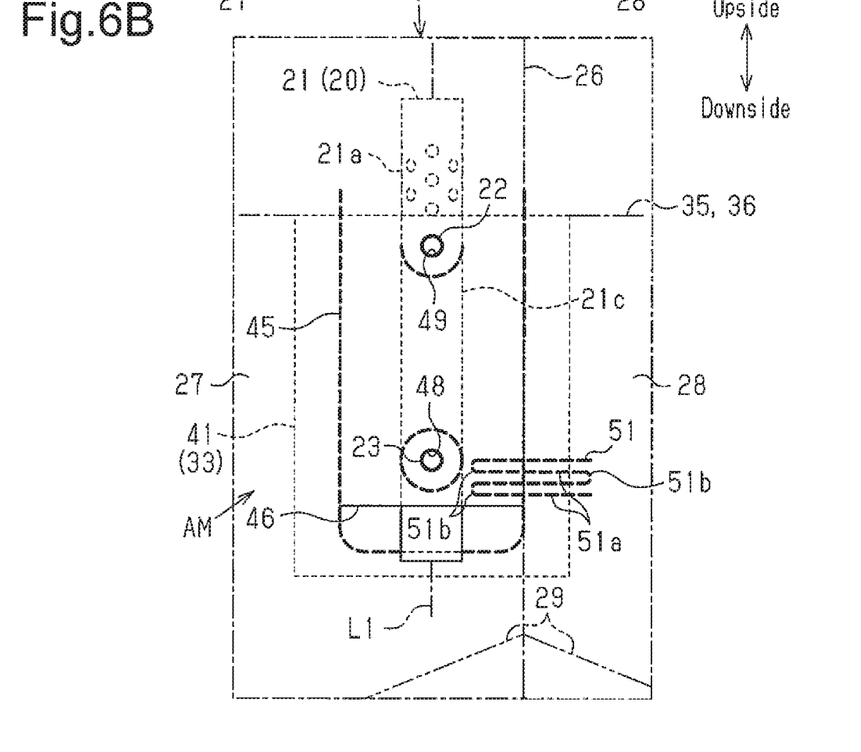
FIG. 6B is an enlarged developed view illustrating part of FIG. 6A.

FIGS. 4A and 4B show the airbag module AM with the airbag 25 in an uninflated-spread state, in which the airbag 25 is spread flat without being filled with inflation gas, as viewed from the inner side of the automobile. FIGS. 3A and 3B show the airbag module AM in which the airbag 25 is cut at the center in the automobile width direction to show the internal structure of the airbag module AM as viewed from the outer side of the automobile. FIGS. 5A and 5B show the airbag 25 in a state in which a peripheral joint portion 29 is disjoined and the airbag 25 is spread flat.

As shown in FIGS. 3A, 4A, and 5A, the main part of the airbag 25 is formed by folding a single fabric piece (also referred to as a base fabric sheet, or a fabric panel) along a fold line 26, which is a folding portion at the center in the width direction, to be superposed on itself in the automobile width direction, and joining the superposed parts. To distinguish the two superposed parts of the airbag 25, the part located on the inner side will be referred to as a first fabric portion 27, and the part located on the outer side will be referred to as a second fabric portion 28. The thickness direction of the superposed first and second fabric portions 27, 28 coincides with the automobile width direction.

The first fabric portion 27 and the second fabric portion 28 are preferably made of a material having high strength and flexibility that can be folded easily. The material may be, for example, woven cloth made of polyester yarns or polyimide yarns.

The first fabric portion 27 and the second fabric portion 28 are joined to each other as described above at the peripheral joint portion 29 provided in the peripheral portion. In the present embodiment, the peripheral joint portion 29 is formed by sewing parts of the peripheral portion of the first and second fabric portions 27, 28 except for the rear end, in other words, except for the part in the vicinity of the fold line 26. Sewing is also performed on a joint portion 45, which will be discussed below.

The sewn portions are depicted by first to third different broken lines in FIGS. 3A to 7B and 9A to 10B. The first broken line includes thick line segments of a certain length arranged intermittently and represents sewn portions as viewed from the outer side or the inner side of the automobile (refer to the peripheral joint portion 29 in FIG. 4A). The second broken line includes thin line segments of a certain length that is longer than those in a typical broken line arranged intermittently, and represents the state of sewing threads that are located, for example, behind a fabric piece and cannot be seen directly (refer to the joint portion 45 in FIG. 9B). The third broken line includes dots arranged at predetermined intervals and represents a state of sewing threads at positions between the first fabric portion 27 and the second fabric portion 28, which are sewn members (see the peripheral joint portion 29 in FIG. 3A). That is, diagrams depicted with the third broken lines show the structure along the cross-section that passes through the sewn portions.

The peripheral joint portion 29 may be formed by a method other than sewing using sewing threads as described above but may be formed by, for example, using adhesive. Such modification is also applicable to the joint portion 45.

As shown in FIG. 7A, the airbag 25 includes an inflation portion 31 and a tubular storage chamber 32. The inflation portion 31 is inflated by inflation gas discharged from the gas outlet portion 21a. The storage chamber 32 stores the inflator 21. The storage chamber 32 is located outside the inflation portion 31.

Figure 2A:
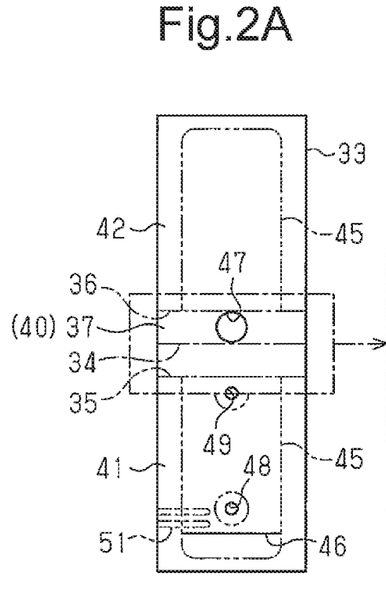
FIG. 2A is a developed view illustrating a storage fabric sheet of the embodiment before being folded.
Figure 2B:
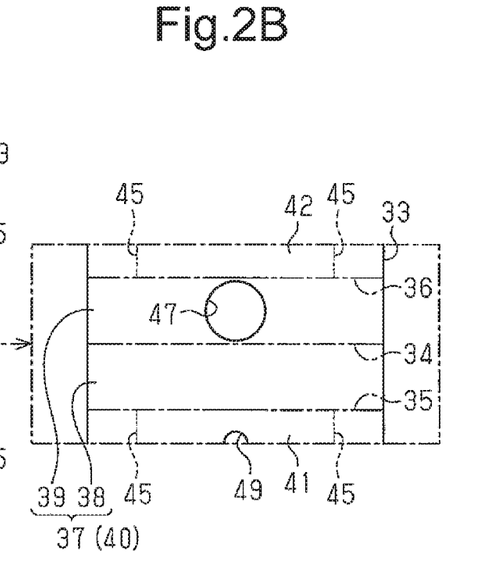
FIG. 2B is an enlarged developed view illustrating part of FIG. 2A.
Figure 9A:
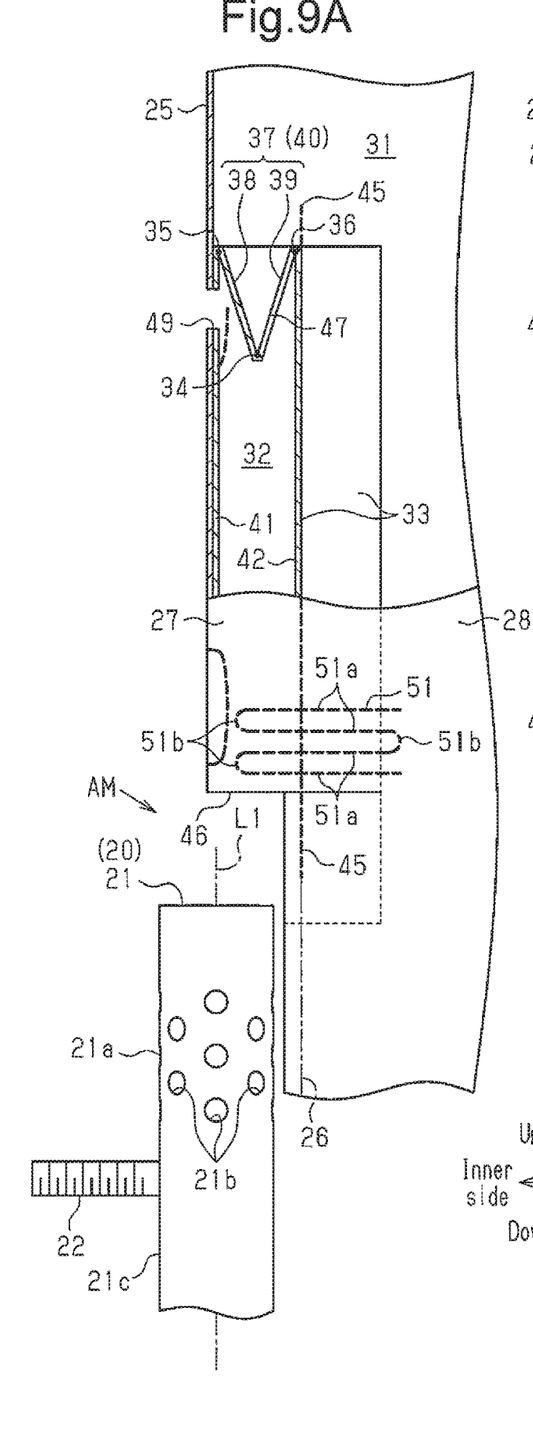
FIG. 9A is a partial cross-sectional view of the embodiment, illustrating a portion including the storage chamber of the airbag before the gas generator is installed.

To form the inflation portion 31 and the storage chamber 32, one vertically elongated storage fabric sheet 33 made of the same material as that of the first fabric portion 27 and the second fabric portion 28 is used. FIG. 2A shows the storage fabric sheet 33 before being folded. As shown in FIGS. 2A, 2B, and 9A, a valley fold line 34, which is a first bending portion, is provided in the central portion in the longitudinal direction of the storage fabric sheet 33. The valley fold line 34 extends in the width direction (the lateral direction in FIGS. 2A and 2B). Two mountain fold lines 35, 36, which are second bending portions, are provided at the central portion of the storage fabric sheet 33 in the longitudinal direction and at positions on the opposite sides of the valley fold line 34 in the longitudinal direction. The mountain fold lines 35, 36 extend in the width direction of the storage fabric sheet 33.

In the storage fabric sheet 33, the portion between the mountain fold lines 35, 36 constitutes a partition wall 37 separating the storage chamber 32 and the inflation portion 31 from each other. Part of the partition wall 37 between the valley fold line 34 and the mountain fold line 35 constitutes a superposed portion 38. Part of the partition wall 37 between the valley fold line 34 and the mountain fold line 36 constitutes a superposed portion 39. The superposed portions 38, 39 are bendably connected to each other via the first bending portion (the valley fold line 34). The superposed portions 38, 39 bent and superposed on each other at the first bending portion (the valley fold line 34) constitute an extendable portion 40, which can be extended and contracted in the longitudinal direction of the specified mounting protrusion 22.

The storage fabric sheet 33 has two sections that sandwich the partition wall 37 from the opposite sides in the longitudinal direction of the storage fabric sheet 33. One of these sections that is adjacent to the mountain fold line 35 constitutes a storage wall portion 41, and the one adjacent to the mountain fold line 36 constitutes a storage wall portion 42. The superposed portion 38 and the storage wall portion 41 are bendably connected to each other via a second bending portion (the mountain fold line 35), and the superposed portion 39 and the storage wall portion 42 are bendably connected to each other via a second bending portion (the mountain fold line 36).

Figure 8:
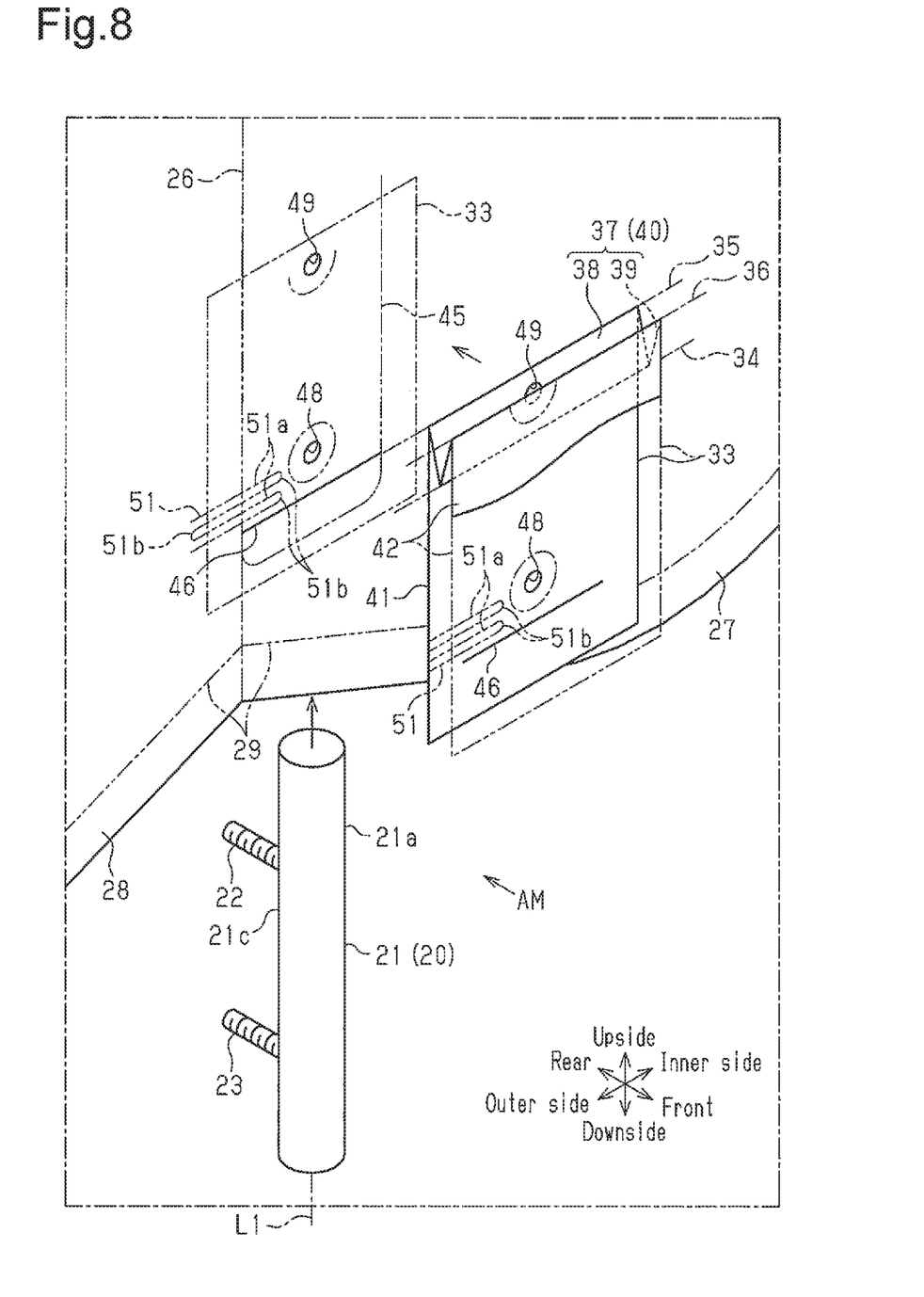
FIG. 8 is an exploded partial perspective view illustrating components of the airbag module of the embodiment.

As shown in FIG. 8, the storage fabric sheet 33 is accordion-folded by being valley-folded along the valley fold line 34 and mountain-folded along the mountain fold lines 35, 36. The superposed portions 38, 39 and the storage wall portions 41, 42 are stacked in the thickness direction thereof. The thickness direction of the superposed portions 38, 39 and the storage wall portions 41, 42 coincides with the longitudinal direction of the specified mounting protrusion 22. The thickness direction of the superposed portions 38, 39 and the storage wall portions 41, 42 also coincides with the thickness direction of the superposed first and second fabric portions 27, 28 (the automobile width direction). The superposed portions 38, 39 are located between the storage wall portions 41, 42 and respectively connected to the upper ends of the storage wall portions 41, 42.

The storage fabric sheet 33 is reduced in the longitudinal size by being accordion-folded as described above (see FIG. 8). As shown in FIGS. 5A, 5B, 6A, and 6B, the storage fabric sheet 33 is located in a section between the first fabric portion 27 and the second fabric portion 28 and across the fold line 26. The accordion-folded storage fabric sheet 33 is joined to the first fabric portion 27 and the boundary between the first fabric portion 27 and the second fabric portion 28 by the joint portion 45, which is substantially U-shaped and provided along the periphery of the storage fabric sheet 33 except for the upper edge. That is, most of the joint portion 45 joins most of the storage fabric sheet 33 to the first fabric portion 27. Part of the joint portion 45 is located on the fold line 26. As such, the main parts of the storage wall portions 41, 42 are joined to the first fabric portion 27 by the joint portion 45.

As shown in FIGS. 4A, 4B, 5A, and 5B, the inflation portion 31 of the airbag 25 is located in a space that is located between the first fabric portion 27 and the second fabric portion 28 and surrounded by the peripheral joint portion 29. As shown in FIG. 1, the inflation portion 31 is deployed and inflated on the side of part of the upper body of the occupant P, more specifically, on the side of the region from the thorax region PT to the shoulder region PS, thereby restraining the same region to protect it from impact. As shown in FIG. 7A, the storage wall portion 42 of the storage fabric sheet 33 constitutes part of the storage chamber 32 and part of the inflation portion 31.

The main part of the storage chamber 32 is defined by a space that is located between the storage wall portions 41, 42 of the storage fabric sheet 33 and surrounded by the joint portion 45 and the partition wall 37. A region of the first fabric portion 27 that is surrounded by the joint portion 45 also constitutes part of the storage chamber 32. The storage chamber 32 configured as described above has a tubular shape extending in the vertical direction outside the inflation portion 31.

Figure 9B:
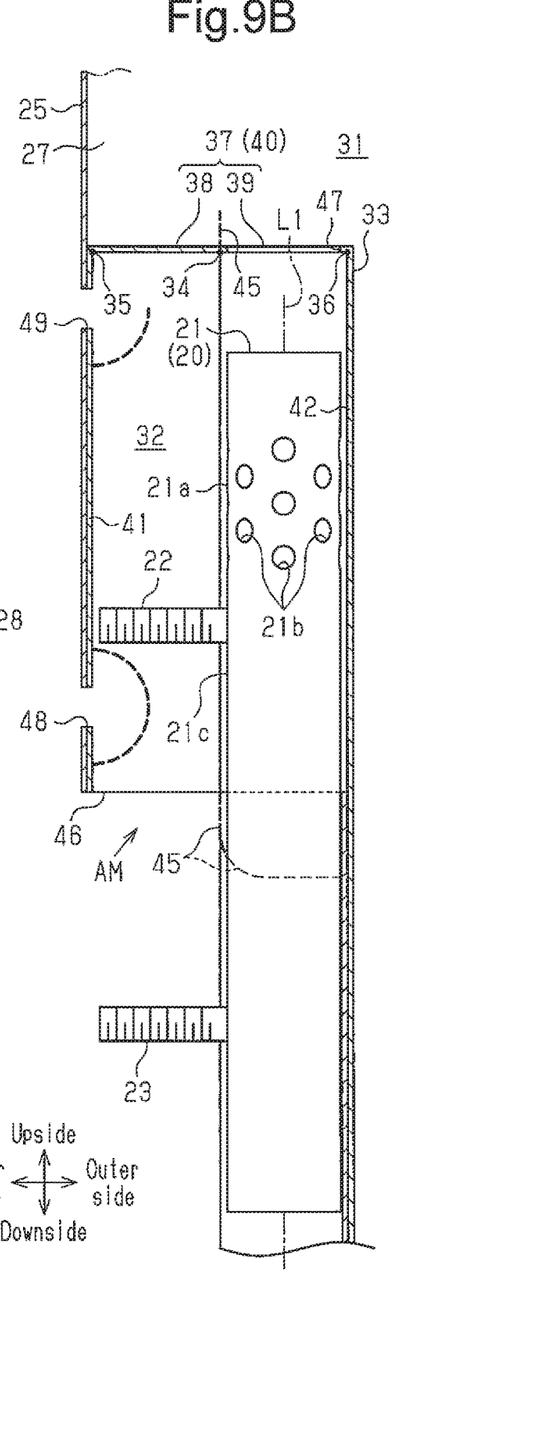
FIG. 9B is a partial cross-sectional view showing a state in which the gas generator is being inserted into the storage chamber.

As shown in FIGS. 5A and 5B, the first fabric portion 27, the folding portion (fold line 26), and the second fabric portion 28 are formed of a common fabric sheet. As shown in FIGS. 9A and 9B, the superposed portions 38, 39 and the storage wall portions 41, 42 are bent at the bending portions (the valley fold line 34 and the mountain fold lines 35, 36) to be stacked in the thickness direction between the first fabric portion 27 and the second fabric portion 28.

As shown in FIG. 8, of the storage wall portions 41, 42, the storage wall portion 41, which is superposed on the first fabric portion 27, has an insertion port 46 for the inflator 21. The insertion port 46 is located in a lower part of the region surrounded by the joint portion 45. Also, the region of the first fabric portion 27 surrounded by the joint portion 45 has an insertion port 46 for the inflator 21 in a lower part. The insertion ports 46 are slits that extend from the folding portion (the fold line 26) in a direction orthogonal to the folding portion (the fold line 26) and away from the second fabric portion 28. The length of the insertion ports 46 (slits) is set to allow the gas generator 20 to be inserted.

As shown in FIGS. 2A and 2B, part of the partition wall 37 is provided with a pass-through portion 47 through which the non-outlet portion 21c is passed such that the gas discharging holes 21b are positioned in the inflation portion 31. The pass-through portion 47 is configured by a circular hole the size of which is set such that the inner wall surface closely contacts the outer circumferential surface of the non-outlet portion 21c. In the present embodiment, the storage fabric sheet 33 is made of fabric and has some elasticity. Thus, the inner diameter of the pass-through portion 47 is set equal to or slightly smaller than the outer diameter of the non-outlet portion 21c.

The partition wall 37 is assumed to be divided into a region close to mounting holes 48, 49, which will be discussed below, relative to the valley fold line 34 (the first bending portion) and a region far from the mounting holes 48, 49 relative to the valley fold line 34 (the first bending portion). In this case, the center of the pass-through portion 47, which is a circular hole, is positioned in the region of the partition wall 37 that is relatively far from the mounting holes 48, 49. The superposed portion 38 is located in the region of the partition wall 37 that is relatively close to the mounting holes 48, 49. The superposed portion 39 is located in the region of the partition wall 37 that is relatively far from the mounting holes 48, 49. In the present embodiment, the pass-through portion 47 is entirely located in the superposed portion 39, which is farther from the mounting holes 48, 49 than the superposed portion 38. That is, the pass-through portion 47 is entirely located in the superposed portion 39, which is closer to the storage wall portion 42 than the superposed portion 38.

As shown in FIGS. 7A and 7B, the partition wall 37 has a function of separating the storage chamber 32 and the inflation portion 31 from each other as described above. The partition wall 37 also has a function of restricting leakage of the inflation gas in the inflation portion 31 to the storage chamber 32 through the gap between the inner wall surface of the pass-through portion 47 and the outer circumferential surface of the non-outlet portion 21c.

As shown in FIGS. 9A and 9B, the storage wall portion 41 is farther from the inflation portion 31 than the storage wall portion 42 and is superposed on the first fabric portion 27. The storage wall portion 41 and the first fabric portion 27 have the two mounting holes 48, 49 located in the region surrounded by the joint portion 45. In the above-mentioned region of the storage wall portion 41 and the first fabric portion 27, the mounting holes 48, 49 are provided in two places on the leading side in the insertion direction of the gas generator 20 with respect to the insertion ports 46. In the present embodiment, the mounting holes 48, 49 are located in two positions between the insertion ports 46 and the pass-through portion 47.

As shown in FIG. 7A, the mounting hole 49 is provided in the parts of the storage wall portion 41 and the first fabric portion 27 that face the specified mounting protrusion 22 when the part of the non-outlet portion 21c at the boundary with the gas outlet portion 21a is surrounded by the pass-through portion 47. The mounting hole 48 is provided in the parts of the storage wall portion 41 and the first fabric portion 27 that face the mounting protrusion 23 in the same state as described above.

As shown in FIGS. 8 and 9A, of the mounting holes 48, 49, the mounting hole 48 is the rearmost mounting hole in the insertion direction of the gas generator 20. The airbag 25 has an increased stiffness portion 51 located between the insertion ports 46 and the mounting hole 48 (the rearmost mounting hole). The increased stiffness portion 51 functions as an opening promoting portion that opens the insertion ports 46. The increased stiffness portion 51 is formed by the sewing threads that are used to sew the storage wall portion 41 and a section across the folding portion (the fold line 26) in the first fabric portion 27 and the second fabric portion 28. In other words, the increased stiffness portion 51 is formed by sewing the storage wall portion 41 to the first and second fabric portions 27, 28 using sewing threads.

In the present embodiment, the increased stiffness portion 51 includes straight sections 51a and arcuate curved sections 51b. The straight sections 51a are separated from each other in the direction in which the folding portion (the fold line 26) extends, and each extend in a direction orthogonal to the folding portion (the fold line 26). Each curved section 51b connects ends of an adjacent pair of the straight sections 51a. Among the straight sections 51a, the straight section 51a that is located at the rearmost position in the increased stiffness portion 51 in the insertion direction of the gas generator 20 is adjacent to the insertion ports 46. Among the straight sections 51a, the straight section 51a that is located at the most leading position in the increased stiffness portion 51 in the insertion direction of the gas generator 20 is located in the vicinity of the side of the mounting hole 48 (the rearmost mounting hole). Thus, the increased stiffness portion 51 is provided over the entire region between the insertion ports 46 and the mounting hole 48 (the rearmost mounting hole) in the insertion direction of the gas generator 20.

Further, the part of the increased stiffness portion 51 in the first fabric portion 27 is located between the mounting hole 48 (the rearmost mounting hole) and the folding portion (the fold line 26) in the direction orthogonal to the axis L1 of the gas generator 20 stored in the storage chamber 32. The part of the increased stiffness portion 51 in the second fabric portion 28 is located between the folding portion (the fold line 26) and a section that is separated from the folding portion (the fold line 26) by a certain distance in the direction orthogonal to the axis L1. The first and second fabric portions 27, 28 have a higher stiffness in the region where the increased stiffness portion 51 is provided at least than in the surrounding regions.

The airbag module AM is made compact as shown in FIG. 7B by folding the airbag 25 in the uninflated-spread state shown in FIG. 4A. The airbag module AM is folded in this manner to be suitably stored in the storage portion 17, which has a limited size in the seat back 14. The airbag module AM with the folded airbag 25 is held in the storage form by a holder such as a binding tape (not shown).

The airbag module AM held in the storage form is arranged in the storage portion 17. As shown in FIGS. 7A and 7B, the specified mounting protrusion 22 and the mounting protrusion 23 are respectively passed through holes 16 in the side frame portion 15. The gas generator 20 is fixed to the side frame portion 15 together with the airbag 25 by fastening nuts 18 to the specified mounting protrusion 22 and the mounting protrusion 23.

As shown in FIG. 1, the side airbag apparatus includes an impact sensor 61 and a controller 62 in addition to the above-described airbag module AM. The impact sensor 61 is formed by an acceleration sensor and the like. The impact sensor 61 is installed in the body side portion of the automobile 10 to detect an impact applied to the body side portion from the outer side. The controller 62 controls operation of the inflator 21 based on a detection signal from the impact sensor 61.

Furthermore, the automobile 10 is equipped with a seat belt apparatus for restraining the occupant P seated on the automobile seat 12. Illustration of the seat belt apparatus is omitted in FIG. 1.

Operation of the side airbag apparatus according to the above-described embodiment will now be described.

First, a procedure of mounting the gas generator 20 to the airbag 25 will be described.

As shown in FIG. 9A, when mounting the gas generator 20 to the airbag 25, the gas generator 20 is inserted into the gap between the storage wall portions 41, 42 of the storage chamber 32 through the insertion ports 46, which is provided in the region surrounded by the joint portion 45 in the storage wall portion 41 and the first fabric portion 27.

At this time, the first fabric portion 27 and the second fabric portion 28, which are connected to each other via the folding portion (the fold line 26) and bent at the folding portion (the fold line 26) to be superposed in the thickness direction (the automobile width direction), act to return to the flat state, which is the state before being bent, due to the own restoring force.

In addition, the section that corresponds to the increased stiffness portion 51, which is provided in a section across the folding portion (the fold line 26) in the first fabric portion 27 and the second fabric portion 28, has a higher stiffness at least than that of the surrounding regions. The portion with the increased stiffness acts to be flat from the bent state. In the portion of which the stiffness is increased by the increased stiffness portion 51, the first fabric portion 27 and the storage wall portion 41 act to move away from the second fabric portion 28 and the storage wall portion 42 in the thickness direction. This influences the insertion ports 46, which are located near the increased stiffness portion 51, thereby opening the insertion ports 46.

In particular, in the present embodiment, the rear end of the increased stiffness portion 51 in the insertion direction of the gas generator 20 is positioned adjacent to the insertion ports 46. Thus, the parts of the increased stiffness portion 51 in the first fabric portion 27 and the storage wall portion 41 are located close to the insertion ports 46. In the portion of which the stiffness is increased by the increased stiffness portion 51, the first fabric portion 27 and the storage wall portion 41 act to move away from the second fabric portion 28 and the storage wall portion 42 in the thickness direction. This influences the insertion ports 46, which are located close to the increased stiffness portion 51, to a greater extent, so that the insertion ports 46 open widely.

Further, the insertion ports 46 and the mounting hole 48 at the rearmost end in the insertion direction (the rearmost mounting hole) are close to each other, and the region in between is narrow. However, in the present embodiment, the increased stiffness portion 51 is provided over the entire region between the insertion ports 46 and the mounting hole 48 (the rearmost mounting hole). This ensures the necessary stiffness for opening the insertion ports 46.

Also, in the present embodiment, the part of the increased stiffness portion 51 in the first fabric portion 27 and the storage wall portion 41 is provided between the mounting hole 48 (the rearmost mounting hole) and the folding portion (the fold line 26). This ensures the necessary stiffness for opening the insertion ports 46.

As described above, the increased stiffness portion 51 is provided in the part of the first fabric portion 27 and the storage wall portion 41 between the insertion ports 46 and the mounting hole 48 (the rearmost mounting hole). Thus, the increased stiffness portion 51 is closer to the insertion ports 46 than in a case in which an increased stiffness portion is provided between the adjacent mounting holes 48, 49. Therefore, the insertion ports 46 open wider with a greater force than in a case in which an increased stiffness portion is arranged between the adjacent mounting holes 48, 49. As a result, the operation of inserting the inflator 21, the specified mounting protrusion 22, and the mounting protrusion 23 into the airbag 25 through the insertion ports 46 is easier than in a case in which an increased stiffness portion is located between the adjacent mounting holes 48, 49 and away from the insertion ports 46.

The increased stiffness portion 51 has a simple structure formed by sewing threads used to sew the storage wail portion 41 and a section across the folding portion (the fold line 26) in the first fabric portion 27 and the second fabric portion 28.

When installing the gas generator 20, which starts being inserted into the insertion ports 46, to the airbag 25, it is necessary to bring the specified mounting protrusion 22 close to the mounting hole 49 and bring the mounting protrusion 23 close to the mounting hole 48. This requires that, in the storage chamber 32, the dimension in the direction orthogonal to the axis L1 of the inflator 21 of the region at least between the insertion ports 46 and the mounting hole 49 be set to a dimension that allows insertion of the gas generator 20 as shown in FIG. 9B.

In the present embodiment, the specified mounting protrusion 22 is located close to the gas outlet portion 21*a*, and the mounting hole 49 is located at a position close to the partition wall 37. Thus, the partition wall 37 affects the size of the storage chamber 32 in the direction orthogonal to the axis L1. That is, if the dimension of the partition wall 37 were smaller than the appropriate value, the size of the storage chamber 32 in the direction orthogonal to the axis L1 in the region between the insertion ports 46 and the mounting hole 49 would be smaller than the size that allows insertion of the gas generator 20.

In this respect, the partition wall 37 of the present embodiment includes the extendable portion 40, which is composed of a pair of the superposed portions 38, 39. Thus, in the partition wall 37, changing the angle defined by the adjacent superposed portions 38, 39 at the first bending portion (the valley fold line 34) allows the extendable portion 40 to be extended or contracted in the longitudinal direction of the specified mounting protrusion 22.

Accordingly, the extendable portion 40 is extended before the specified mounting protrusion 22 is passed through the mounting hole 49. This increases the dimension of the storage chamber 32 in the direction orthogonal to the axis L1 to a dimension that allows insertion of the gas generator 20 in the region between the insertion ports 46 and the mounting hole 49. Thus, the gas generator 20 is inserted into the storage chamber 32 without any trouble so that the specified mounting protrusion 22 is guided to the mounting hole 49 and the mounting protrusion 23 is guided to the mounting hole 48.

On the other hand, the pass-through portion 47, which is made of a hole, is entirely located in the superposed portion 39, which is farther from the mounting hole 49 (closer to the inflation portion 31) than the superposed portion 38. The superposed portion 39 is adjacent to the storage wall portion 42.

Figure 10A:
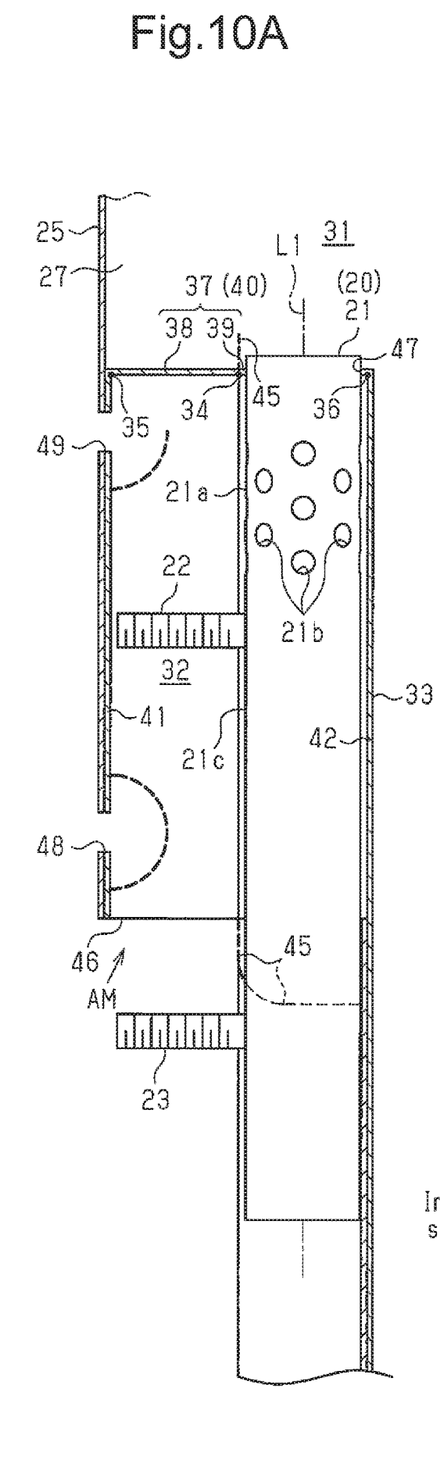
FIG. 10A is a partial cross-sectional view showing a state in which the gas outlet portion of FIG. 9B starts being passed through a pass-through portion.
Figure 10B:
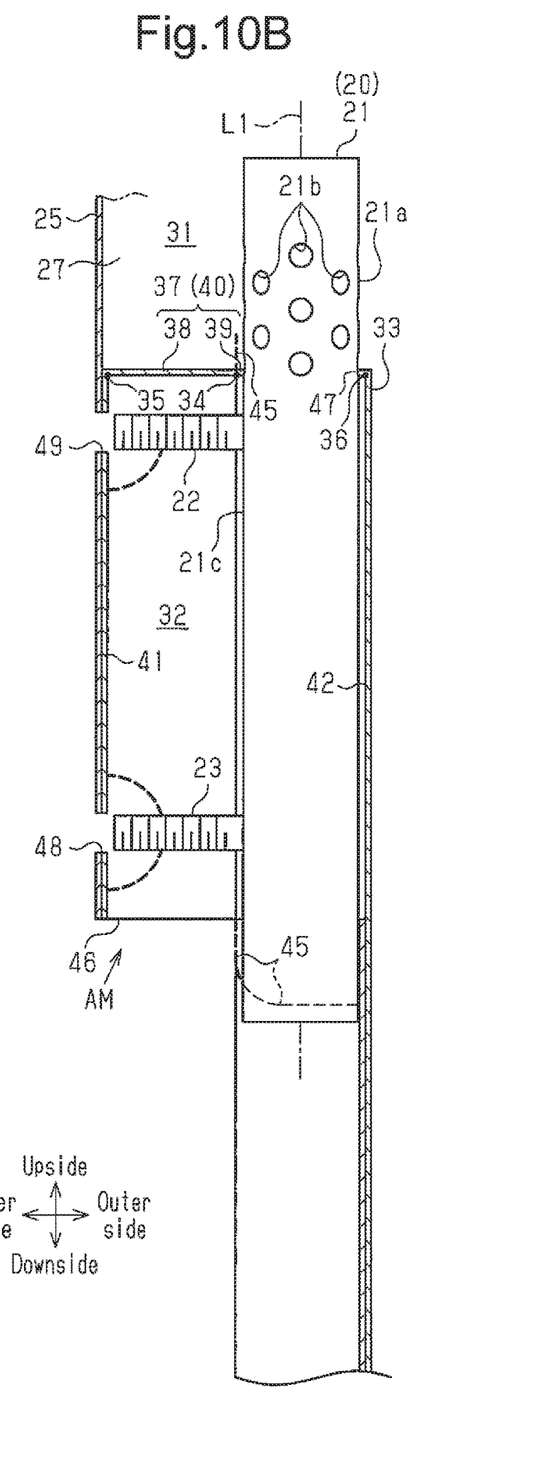
FIG. 10B is a partial cross-sectional view showing a state in which the non-outlet portion has been passed through the pass-through portion.

Accordingly, prior to the insertion of the gas generator 20 into the insertion ports 46, the orientation of the gas generator 20 is adjusted such that the specified mounting protrusion 22 extends toward the storage wall portion 41. As shown in FIG. 9B, the gas generator 20 is inserted into the storage chamber 32 through the insertion ports 46 along the storage wall portion 42. This extends the extendable portion 40, so that the dimension of the storage chamber 32 in the direction orthogonal to the axis L1 is increased to a dimension that allows insertion of the gas generator 20 in the region between the insertion ports 46 and the mounting hole 49. As shown in FIGS. 10A and 10B, it is possible to guide the gas outlet portion 21a to the pass-through portion 47, guide the specified mounting protrusion 22 to the mounting hole 49, and guide the mounting protrusion 23 to the mounting hole 48.

As shown in FIG. 10B, when the part of the non-outlet portion 21c at the boundary with the gas outlet portion 21a is passed through the pass-through portion 47, all the gas discharging holes 21b are located in the inflation portion 31. The partition wall 37 does not have a structure for increasing the stiffness of the portion around the pass-through portion 47. The inner wall surface of the pass-through portion 47 is more likely to be deformed along the outer circumferential surface of the non-outlet portion 21c than when the stiffness is increased. Therefore, the gap generated between the non-outlet portion 21c and the inner wall surface of the pass-through portion 47 is made smaller than in the case in which the stiffness is increased so that deformation is unlikely to occur.

In the present embodiment, the pass-through portion 47 is configured by a circular hole corresponding to the outer shape of the columnar non-outlet portion 21c. Therefore, as compared with a case in which the pass-through portion 47 has another shape, it is easy to cause the inner wall surface of the pass-through portion 47 to closely contact the outer circumferential surface of the non-outlet portion 21c.

In addition, in the present embodiment, the inner diameter of the pass-through portion 47 is set to be equal to or slightly smaller than the outer diameter of the non-outlet portion 21c. Therefore, in a state where the non-outlet portion 21c is passed through the pass-through portion 47, the inner wall surface of the pass-through portion 47 is brought into close contact with the outer circumferential surface of the non-outlet portion 21c. The gap between the non-outlet portion 21c and the inner wall surface of the pass-through portion 47 is the minimum possible size or a size close to the minimum size.

As described above, when the part of the non-outlet portion 21c at the boundary with the gas outlet portion 21a is passed through the pass-through portion 47, the specified mounting protrusion 22 faces the mounting hole 49, and the mounting protrusion 23 faces the mounting hole 48. This brings the gas generator 20 close to the storage wall portion 41. Then, while the partition wall 37 is contracted in the longitudinal direction of the specified mounting protrusion 22, the specified mounting protrusion 22 is passed through the mounting hole 49, and the mounting protrusion 23 is passed through the mounting hole 48. As a result, the gas generator 20 is mounted to the airbag 25 with the specified mounting protrusion 22 and the mounting protrusion 23 positioned outside the airbag 25 (the inflation portion 31 and the storage chamber 32).

Hereafter, operation of the side airbag apparatus of the present embodiment will be described.

When the impact sensor 61 does not detect any impact from the side of the body side portion, the controller 62 does not output to the inflator 21 an activation signal for activating the inflator 21. The inflator 21 thus does not discharge inflation gas. The airbag 25 thus remains stored in the storage portion 17 in the storage form with the gas generator 20 (see FIG. 7B).

In contrast, when the impact sensor 61 detects that an impact of a magnitude greater than or equal to a predetermined value has been applied to the body side portion due to a side collision or the like while the automobile 10 is traveling, the controller 62, based on the detection signal, outputs an activation signal for activating the inflator 21 to the inflator 21. In response to the activation signal, the inflator 21 discharges inflation gas through the gas discharging holes 21h of the gas outlet portion 21a.

The inflation gas is supplied to the inflation portion 31. At this time, since the gap between the inner wall surface of the pass-through portion 47 and the outer circumferential surface of the non-outlet portion 21c is small, the inflation gas supplied to the inflation portion 31 is unlikely to leak to the storage chamber 32.

The inflation portion 31 starts being inflated by the inflation gas supplied as described above. The inflation is carried out while canceling the folded state (deployment). The airbag 25 is projected forward from the seat back 14 with part thereof (a rear portion) remaining in the storage portion 17.

Thereafter, the airbag 25, which continues being supplied with inflation gas, is inflated while being unfolded (deployed) forward between the body side portion and the upper body of the occupant P seated in the automobile seat 12 (the region ranging from the shoulder region PS to the thorax region PT, see FIG. 1). Even at this time, only a small amount of inflation gas leaks to the storage chamber 32 through the gap between the inner wall surface of the pass-through portion 47 and the outer circumferential surface of the non-outlet portion 21c.

The thusly deployed and inflated airbag 25 is located between the upper body of the occupant P and the body side portion, which is bulging into the passenger compartment. The airbag 25 pushes the upper body inward and restrains the upper body. The side impact transmitted to the upper body through the body side portion is reduced by the airbag 25 and the upper body is protected.

The above-described embodiment may be modified as follows.

<Regarding Gas Generator 20>

The specified mounting protrusion 22 and the mounting protrusion 23 may be fixed directly to the non-outlet portion 21c as in the above-illustrated embodiment. Alternatively, the mounting protrusions 22, 23 may be fixed indirectly. For example, a hand-shaped auxiliary member (not shown) may be attached to the outer circumference of the non-outlet portion 21c, and the specified mounting protrusion 22 or the mounting protrusion 23 may be fixed to the auxiliary member.

The gas generator main body may be composed of the inflator 21, which has the gas outlet portion 21a and the non-outlet portion 21c, and a cylindrical retainer covering the non-outlet portion 21c. In this case, the retainer constitutes the outer peripheral portion of the gas generator main body. The retainer is fixed to the inflator 21 by swaging or the like. Of the specified mounting protrusion 22 and the mounting protrusion 23, at least the specified mounting protrusion 22 is provided in the retainer in place of the inflator 21.

As described above, when the gas generator main body is configured by the inflator 21 and the retainer, the gas generator main body is mounted to the airbag 25 in one of the following first and second modes.

First mode: the gas generator main body in which the inflator 21 is attached to the retainer is mounted to the airbag 25 by inserting the specified mounting protrusion 22 and the mounting protrusion 23 into the storage chamber 32 through the insertion ports 46.

Second mode: The retainer and the inflator 21 are separately mounted to the airbag 25. In this mode, firstly, the retainer is inserted into the storage chamber 32 at least together with the specified mounting protrusion 22 through the insertion ports 46, and the specified mounting protrusion 22 is passed through the mounting hole 49 to mount the retainer to the airbag 25. Thereafter, the inflator 21 is inserted into the retainer in the storage chamber 32 through the insertion ports 46, and the non-outlet portion 21c is passed through the pass-through portion 47 of the partition wall 37.

In either the first mode or the second mode, the gas generator is configured such that the specified mounting protrusion 22 projects from the outer periphery of the gas generator main body. Thus, the same operation and advantages as the above embodiment, in which the gas generator main body is configured only by the inflator 21, are achieved.

At least one of the specified mounting protrusion 22 and the mounting protrusion 23 may be changed to a member different from a bolt on condition that the member can fix the inflator 21 to the vehicle.

Two or more mounting protrusions 23 may be provided at a plurality of positions arranged along the axis L1 of the inflator 21 in the non-outlet portion 21c. When two or more mounting protrusions 23 are provided, all the mounting protrusions 23 may be secured to the side frame portion 15 in the same manner (for example, by fastening with bolts and nuts) or in different manners.

The mounting protrusion 23 may be omitted so that only the specified mounting protrusion 22 is used.

In the inflator 21, the position of the specified mounting projection 22 may be farther away from the gas outlet portion 21a in the direction along the axis L1 than in the above-illustrated embodiment. In this case, the extendable portion 40 may be omitted from the partition wall 37.

This is because the influence of the partition wall 37 on the size of the storage chamber 32 in the direction orthogonal to the axis L1 small even without the extendable portion 40. In the region between the insertion ports 46 and the mounting hole 49, the dimension of the storage chamber 32 in the direction orthogonal to the axis L1 can be made larger than the dimension that allows insertion of the inflator 21 and the specified mounting protrusion 22.

<Regarding Inflation Portion 31>

The substantially entire airbag 25 may be configured by the inflation portion 31 as in the above-illustrated embodiment, but may also partially include a non-inflation portion, which is neither supplied with inflation gas nor inflated.

The inflation portion 31 may be divided into two or more chambers (inflation chambers).

<Regarding Storage Chamber 32>

In the above-illustrated embodiment, the storage chamber 32 is provided separately from the inflation portion 31. However, the storage chamber 32 may be constituted by part of the inflation portion 31. In short, the storage chamber 32 may be modified as long as it is formed between the first fabric portion 27 and the second fabric portion 28 and has, as its part, the first fabric portion 27. This modification, as with the above-illustrated embodiment, achieves the advantages in opening the insertion ports 46 and facilitating insertion of the gas generator 20 into the airbag 25 through the insertion ports 46.

<Regarding Insertion Ports 46 and Pass-Through Portion 47>

The insertion ports 46 may be formed by holes in place of slits. Also, the pass-through portion 47 may be formed by a slit in place of the hole.

<Regarding Opening Promoting Portion>

The force of the first fabric portion 27 and the second fabric portion 28 acting to return from the bent state to the flat state is increased if fabric sheets are superposed and as the number of the superposed fabric sheets is increased. Therefore, two or more fabric sheets, each having a first fabric portion 27, a second fabric portion 28, and a folding portion (a fold line 26) may be superposed and folded in half. In this state, the increased stiffness portion 51 is provided in a section across the folding portion (the fold lines 26) in the first fabric portions 27 and the second fabric portions 28. This increases the force that acts to return to the flat state, so that the insertion ports 46 open even wider.

The increased stiffness portion 51 may have a shape different from that of the above-illustrated embodiment as long as the increased stiffness portion 51 is made of sewing threads in a section across the folding portion (the fold line 26) in the first and second fabric portions 27, 28. For example, the increased stiffness portion 51 may have a spiral shape.

The opening promoting portion (the increased stiffness portion 51) may be formed by applying coating agent instead of providing sewing threads.

The opening promoting portion (the increased stiffness portion 51) may be formed by a reinforcing fabric sheet that is provided in a section across the folding portion (the fold line 26) in the first fabric portion 27 and the second fabric portion 28.

If the distance between the insertion ports 46 and the rearmost mounting hole is sufficiently long, the dimension of the increased stiffness portion 51 in the direction orthogonal to the axis L1 in the first fabric portion 27 and the storage wall portion 41 may be set greater than the distance between the rearmost mounting hole (the mounting hole 48) and the folding portion (the fold line 26).

As long as the opening promoting portion has the function of opening the insertion ports 46, any structure different from that of the increased stiffness portion 51 may be employed.

In this case, the opening promoting portion is preferably provided in both the storage wall portion 41 and the first fabric portion 27. In this case, one of the storage wall portion 41, 42, specifically, the storage wall portion 41 is superposed on the first fabric portion 27. Thus, the force with which the opening promoting portion opens the insertion ports 46 is applied not only to the first fabric portion 27, but also to the storage wall portion 41, which is superposed on the first fabric portion 27. This allows the insertion ports 46 to open even wider.

<Types of Applicable Airbag Apparatus>

The present invention may be applied to any airbag apparatuses other than a side airbag apparatus as long as that apparatus includes a gas generator that has a gas generator main body and mounting protrusions, and an airbag that is inflated by inflation gas discharged from the gas generator main body, and the airbag apparatus is mounted to a vehicle using the mounting protrusions.

One example of such airbag apparatuses is an airbag apparatus for protecting knees, that is, a knee airbag apparatus. This type of airbag apparatus protects the region. from the shins to the knees of the occupant by inflating an airbag in front of the lower front parts of the legs of the occupant seated on the vehicle seat.

In addition, the present invention may be applied to a seat cushion airbag apparatus. This type of airbag apparatus inflates an airbag installed in the seat cushion of a vehicle seat with inflation gas in response to impact applied to the vehicle to raise the seating face, thereby restricting forward movement of the occupant on the seat.

<Other Modifications>

The present invention may be applied to a side airbag apparatus of an automobile in which the automobile seat 12 is arranged such that the seat back 14 faces in a direction other than the forward direction, for example, sideways. In this case, when an impact is applied to a side of the automobile seat 12 (in the front-rear direction of the automobile), the side airbag apparatus protects the occupant P from the impact.

The part of the upper body of the occupant P to be protected by the side airbag apparatus may be different from that in the above-illustrated embodiment. In this case, the shape and size of the airbag 25 are changed to a shape and size that can protect the target portion of the occupant P.

Automobiles in which the above-described airbag apparatus can be employed include various industrial vehicles in addition to private cars.

The above-described airbag apparatus may also be applied to an airbag apparatus installed in seats in vehicles other than automobiles, including aircraft and ships.

The invention claimed is:

1. An airbag apparatus comprising:
    a gas generator that includes
        an elongated gas generator main body, which extends along an axis and discharges inflation gas, and
        at least one mounting protrusion, which projects in a direction orthogonal to the axis from at least one position in a direction along the axis, and
    an airbag, which is inflated by the inflation gas, wherein
    the airbag apparatus is configured to be mounted to a vehicle at the at least one mounting protrusion,
    the airbag includes
        at least a first fabric portion and a second fabric portion, which are superposed on each other in a thickness direction, and
        a storage chamber, which is located between the first fabric portion and the second fabric portion,
    part of the storage chamber is constituted by the first fabric portion,
    the storage chamber includes
        an insertion port, which allows the gas generator to be inserted through at least the first fabric portion,
        one or more mounting holes, which are located at positions that are on a leading side of the insertion port of the storage chamber in an insertion direction of the gas generator, wherein the one or more mounting holes allow the at least one mounting protrusion to be passed through at least the first fabric portion, and a rearmost one in the insertion direction of the one or more mounting holes is a rearmost mounting hole, and
        an opening promoting portion, which is located between the insertion port and the rearmost mounting hole and causes the insertion port to open,
    the first fabric portion and the second fabric portion are connected to each other via a folding portion and superposed on each other by being folded at the folding portion,
    the insertion port is located at a position adjacent to the folding portion,
    the opening promoting portion is constituted by an increased stiffness portion, which is provided in a section across the folding portion in the first fabric portion and the second fabric portion, wherein the increased stiffness portion has a higher stiffness than in regions surrounding the opening promoting portion,
    a rear end of the increased stiffness portion in the insertion direction is arranged at a position adjacent to the insertion port,
    the increased stiffness portion is provided over an entire region between the insertion port and the rearmost mounting hole in the insertion direction, and
    part of the increased stiffness portion that is located in the first fabric portion is entirely located between the one or more mounting holes and the folding portion in a direction orthogonal to both an opening direction of the one or more mounting holes and a direction along the axis of the gas generator, which is inserted through the insertion port.

2. The airbag apparatus according to claim 1, wherein the first fabric portion, the folding portion, and the second fabric portion are formed of a common fabric sheet.

3. The airbag apparatus according to claim 1, wherein the increased stiffness portion is formed by a sewing thread that is used to sew a section across the folding portion in the first fabric portion and the second fabric portion.

4. The airbag apparatus according to claim 1, wherein
    the storage chamber includes the first fabric portion and two storage wall portions, which are arranged between the first fabric portion and the second fabric portion and superposed on each other in the thickness direction,
    at least main parts of the storage wall portions are joined to the first fabric portion by a joint portion, which is provided along peripheries of the main parts,
    one of the storage wall portions is superposed on the first fabric portion, and
    the insertion port and the one or more mounting holes are provided in a region surrounded by the joint portion in each of the first fabric portion and the storage wall portion that is superposed on the first fabric portion.

\* \* \* \* \*